(12) United States Patent
Hyde et al.

(10) Patent No.: US 9,407,105 B2
(45) Date of Patent: Aug. 2, 2016

(54) SYSTEMS AND METHODS FOR TRANSFERRING ELECTRICAL ENERGY BETWEEN VEHICLES

(71) Applicant: Elwha LLC, Bellevue, WA (US)

(72) Inventors: Roderick A. Hyde, Redmond, WA (US); Muriel Y. Ishikawa, Livermore, CA (US); Clarence T. Tegreene, Mercer Island, WA (US); Charles Whitmer, North Bend, WA (US); Lowell L. Wood, Jr., Bellevue, WA (US); Victoria Y. H. Wood, Livermore, WA (US)

(73) Assignee: ELWHA LLC, Bellevue, WA (US)

( * ) Notice: Subject to any disclaimer, the term of this patent is extended or adjusted under 35 U.S.C. 154(b) by 117 days.

(21) Appl. No.: 13/625,721

(22) Filed: Sep. 24, 2012

(65) Prior Publication Data

US 2014/0088804 A1    Mar. 27, 2014

(51) Int. Cl.
*B60L 9/00*  (2006.01)
*B60L 11/00* (2006.01)
*G05D 1/00*  (2006.01)
*G05D 3/00*  (2006.01)
*G06F 7/00*  (2006.01)
*G06F 17/00* (2006.01)
*H02J 7/00*  (2006.01)
*B60L 11/18* (2006.01)
*H02J 5/00*  (2016.01)
*H02J 7/02*  (2016.01)

(52) U.S. Cl.
CPC ............. *H02J 7/0054* (2013.01); *B60L 11/182* (2013.01); *H02J 5/005* (2013.01); *H02J 7/025* (2013.01); *Y02T 10/7005* (2013.01); *Y02T 10/7072* (2013.01); *Y02T 90/122* (2013.01); *Y02T 90/14* (2013.01)

(58) Field of Classification Search
CPC . B60L 11/00; B60L 11/1809; B60L 11/1816; B60L 11/182; B60L 11/1838; B60L 11/1848; B60L 11/1861
See application file for complete search history.

(56) References Cited

U.S. PATENT DOCUMENTS

| 5,642,270 | A  | 6/1997  | Green et al.   |
|-----------|----|---------|----------------|
| 5,803,215 | A  | 9/1998  | Henze et al.   |
| 5,858,568 | A  | 1/1999  | Hsu et al.     |
| 6,014,597 | A  | 1/2000  | Kochanneck     |
| 6,087,806 | A  | 7/2000  | Fujioka        |
| 6,107,691 | A  | 8/2000  | Gore et al.    |
| 6,380,637 | B1 | 4/2002  | Hsu et al.     |
| 6,649,289 | B2 | 11/2003 | Hsu et al.     |
| 6,675,153 | B1 | 1/2004  | Cook et al.    |
| 7,040,430 | B2 | 5/2006  | Nomura et al.  |
| 7,313,469 | B2 | 12/2007 | Wobben         |
| 8,498,886 | B2 | 7/2013  | Epstein et al. |

(Continued)

*Primary Examiner* — Yonel Beaulieu
*Assistant Examiner* — Lail Kleinman

(57) ABSTRACT

Motor vehicles may need to exchange electrical energy. At least one vehicle may determine a target charge state. The vehicle may then identify another vehicle with which to exchange energy. The vehicles may negotiate a quantity to be transferred, transfer parameters for the exchange, and/or the like. The vehicles may be in a common fleet or an affinity group. A central location may facilitate the identification and/or negotiation process. The transfer may be monitored and may be controlled based on monitoring data collected. The transfer may be wired or wireless, and the vehicles may be stationary or in motion during the transfer. The vehicles may be, among others, pure electric vehicles, hybrid vehicles, and/or fuel cell vehicles.

19 Claims, 11 Drawing Sheets

(56) References Cited

U.S. PATENT DOCUMENTS

| | | |
|---|---|---|
| 8,509,976 B2 | 8/2013 | Kempton |
| 2003/0059654 A1 | 3/2003 | Hsu et al. |
| 2003/0209375 A1 | 11/2003 | Suzuki et al. |
| 2003/0220840 A1 | 11/2003 | Vashi et al. |
| 2005/0261919 A1 | 11/2005 | Kundtz et al. |
| 2006/0100754 A1 | 5/2006 | Wobben |
| 2007/0188137 A1 | 8/2007 | Scheucher |
| 2008/0040263 A1 | 2/2008 | Pollack et al. |
| 2008/0053716 A1 | 3/2008 | Scheucher et al. |
| 2008/0136371 A1 | 6/2008 | Sutardja |
| 2008/0281663 A1 | 11/2008 | Hakim et al. |
| 2008/0312782 A1 | 12/2008 | Berdichevsky et al. |
| 2009/0021385 A1 | 1/2009 | Kelty et al. |
| 2009/0030712 A1 | 1/2009 | Bogolea et al. |
| 2009/0115377 A1 | 5/2009 | Schwenke et al. |
| 2009/0210357 A1 | 8/2009 | Pudar et al. |
| 2009/0313033 A1 | 12/2009 | Hafner et al. |
| 2010/0106641 A1 | 4/2010 | Chassin et al. |
| 2011/0025267 A1* | 2/2011 | Kamen et al. .............. 320/109 |
| 2011/0071932 A1* | 3/2011 | Agassi et al. .............. 705/34 |
| 2011/0145089 A1 | 6/2011 | Khunger et al. |
| 2011/0224900 A1* | 9/2011 | Hiruta et al. .............. 701/201 |
| 2011/0238519 A1 | 9/2011 | Basak et al. |
| 2011/0302078 A1* | 12/2011 | Failing .............. 705/39 |
| 2012/0005125 A1 | 1/2012 | Jammer |
| 2012/0146582 A1 | 6/2012 | Lei et al. |
| 2012/0161925 A1 | 6/2012 | Gale et al. |
| 2012/0303259 A1 | 11/2012 | Prosser |
| 2013/0090936 A1 | 4/2013 | Solomon et al. |
| 2014/0089064 A1 | 3/2014 | Hyde et al. |

\* cited by examiner

SYSTEMS AND METHODS FOR TRANSFERRING ELECTRICAL ENERGY BETWEEN VEHICLES

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

None

RELATED APPLICATIONS

U.S. patent application Ser. No. 13/625,713, entitled SYSTEMS AND METHODS FOR TRANSFERRING ELECTRICAL ENERGY BETWEEN VEHICLES, naming Roderick A. Hyde, Muriel Y. Ishikawa, Clarence T. Tegreene, Charles Whitmer, Lowell L. Wood, Jr., and Victoria Y. H. Wood as inventors, filed 24 Sep. 2012, is related to the present application. U.S. patent application Ser. No. 13/625,729, entitled SYSTEMS AND METHODS FOR TRANSFERRING ELECTRICAL ENERGY BETWEEN VEHICLES, naming Roderick A. Hyde, Muriel Y. Ishikawa, Clarence T. Tegreene, Charles Whitmer, Lowell L. Wood, Jr., and Victoria Y. H. Wood as inventors, filed 24 Sep. 2012, is related to the present application.

TECHNICAL FIELD

This disclosure relates to systems and methods for transferring electrical energy between motor vehicles, such as hybrid or electric automobiles.

SUMMARY

A motor vehicle may need to exchange electrical energy. To do so, exchange partners with whom to conduct the exchange may be identified. Additionally, a quantity to be transferred, exchange terms, and/or transfer parameters may be determined. The quantity of electrical energy may then be transferred between the two motor vehicles. The transfer may be monitored to determine the quantity transferred and/or to detect dangerous conditions.

DETAILED DESCRIPTION OF PREFERRED EMBODIMENTS

Figure 1:
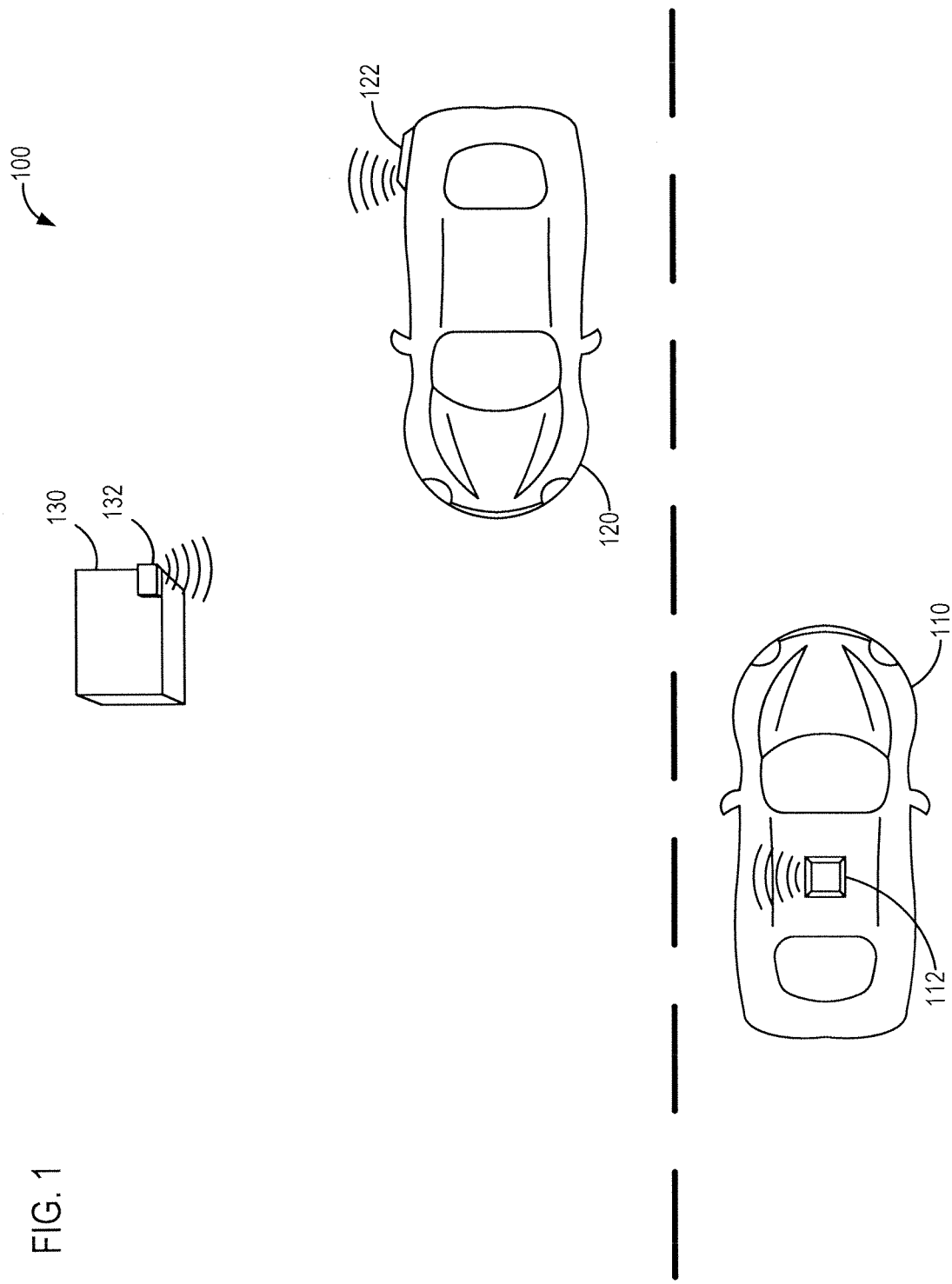
FIG. 1 is a plan view of a system for negotiating an exchange of electrical energy between a first motor vehicle and a second motor vehicle.

Motor vehicles may use electricity to provide power to a drive train, may produce electrical energy, and/or may store electrical energy. Such motor vehicles may have limited storage capacity for electrical energy and/or may have less electrical energy available than is required to reach a destination. In some cases, a first motor vehicle may need to acquire electrical energy while a second motor vehicle may have excess electrical energy available for transfer. In such a case, the second motor vehicle may transfer the excess electrical energy to the first motor vehicle.

Various systems and methods may aid in transferring the electrical energy. For example, the first motor vehicle may determine a target charge state for an energy storage system and/or a desired amount of electrical energy that it would like to receive before transfer. Also, the first motor vehicle may identify possible exchange partners and select the second vehicle according to predetermined criteria.

The first and second motor vehicles may include negotiation subsystems to determine quantity, price, transfer parameters, and/or the like for the transfer. Alternatively or in addition, a central location may coordinate negotiations, identify exchange partners, authorize the transaction, and/or the like. The first and second motor vehicles may belong to an affinity group, such as an automobile club, common fleet, or the like. The central location may coordinate transfers among members of the affinity group.

The first and second motor vehicles may then transfer electrical energy in accordance with a negotiated agreement. The first and/or second motor vehicle may also include a monitoring subsystem to ensure the electrical energy is transferred in accordance with the negotiated agreement. The motor vehicles may store information related to the transfer, such as transfer statistics, and/or may transmit the information to the central location.

A variety of mechanisms may be used to transfer the electrical energy between the first and second motor vehicles. The transfer mechanism may be wired or wireless. The transfer may be performed while the motor vehicles are in motion or while they are stationary. One motor vehicle may control movement of the other motor vehicle during a transfer while in motion.

In certain embodiments, a negotiation, communication, and/or target determination subsystem may be located on the first vehicle, may be located on the second vehicle, and/or may be remote from either vehicle, such as at a central location. A communication subsystem at a central location may receive a request for electrical energy from the first vehicle. The request may include a quantity of electrical energy requested; an anticipated route; a next charging stop; a charge state; an urgency indicator; status data, such as location data, route (which may include elevation changes), traffic conditions, stops completed, stops remaining, energy remaining, average energy usage; and/or the like. A negotiation subsystem and/or communication subsystem may determine a quantity of energy to transfer between the first vehicle and the second vehicle, and/or a target determination subsystem may determine a target charge state for the first and/or second vehicle. A quantity of electrical energy to be transferred may be determined from the request by the negotiation subsystem. If the negotiation subsystem is at the central location, the central location may transmit an indication of the quantity and/or charge state to the first and/or second vehicle.

The quantity and/or charge state may be determined by predicting when the first motor vehicle will next receive additional electrical energy. For example, the negotiation subsystem and/or target determination subsystem may determine the distance to a next charging stop where additional electrical energy will be available for transfer to the first vehicle. The next charging stop may be along a projected route or near a projected route and/or may be chosen according to other predetermined criteria. The next charging stop may be more than a predetermined minimum distance away in some embodiments. The central location may transmit to a negotiation and/or target determination subsystem an indication of the distance to the next charging stop. For a central location managing a fleet of vehicles, the central location may coordinate a plurality of transfers among the fleet vehicles and determine quantities and/or charge states for each transfer. The negotiation and target determination subsystems may be further configured to determine an amount of energy to be transferred at each of a plurality of charging stops to determine the quantity and/or charge state.

Alternatively or in addition, the quantity or charge state may be determined by the negotiation and/or target determination subsystem based on input from the central location and/or input from a user of the system. The user may be a driver or passenger in the vehicle. The user input may include an anticipated destination and/or an anticipated route from which the quantity and/or charge state can be determined. A travel itinerary, anticipated destination, and/or anticipated route may also be accessed from a memory. The memory may be on the vehicle and/or at a location remote from the vehicle.

In some embodiments, the quantity may be determined from the charge state by calculating an amount of energy required to reach the target charge state and calculating an amount of energy expected to be lost during transfer. The negotiation subsystem and/or target determination subsystem may be further configured to calculate a transfer rate and a transfer time to transfer the quantity and/or reach the charge state. Also, the quantity and/or charge state may be calculated by determining an amount of energy that should remain in the first and/or second vehicle, either of which may be the buyer and/or seller vehicle, once the transfer is complete. The quantity and/or charge state may be specified in units of energy, in units of electric charge, as a fraction of storage capacity, as a distance to be travelled, as a price, or the like. When the quantity is specified as a fraction of storage capacity, the negotiation subsystem may access a memory to determine the storage capacity of the first vehicle.

The negotiation subsystem and/or a source identification subsystem may be used by the first vehicle to identify the second vehicle. Various methods may be used to identify the second vehicle. A transfer mechanism may be coupled to the second vehicle, and the first vehicle may detect the presence of a connection. The second vehicle may be identified by transmitting a request for electrical energy to the central location and receiving an indication of the second vehicle from a communication subsystem at a central location. The communication subsystem may also transmit an indication of a rendezvous location, transfer parameters, and/or the like to one or both vehicles. The source identification subsystem may identify the second vehicle by identifying a dedicated source vehicle nearest the first vehicle. Identifying the second vehicle may include determining whether the first vehicle is associated with an affinity group.

The source identification subsystem may identify the second vehicle according to predetermined criteria. The predetermined criteria may be received from the first vehicle and/or may be accessed from an information storage subsystem, which may store member information about affinity group members. The source identification subsystem may identify the second vehicle by retrieving the member information from the information storage subsystem. For example, the source identification subsystem may identify the second vehicle by retrieving information to determine whether the second vehicle includes one or more transfer mechanisms compatible with the first vehicle, to determine a rating indication associated with the second vehicle, and/or the like. The rating indication may include an indication of average transfer efficiency, an indication of average transfer rate, an indication of a total amount of energy transferred, an indication of a net amount of energy transferred, and/or the like.

The source identification subsystem may identify a plurality of possible exchange partners according to predetermined criteria. The communication subsystem may then transmit indications of the possible exchange partners to the first vehicle. The predetermined criteria may be received from the first vehicle. The possible exchange partners may be associated with an affinity group, be less than a predetermined distance or driving time from the first vehicle, be able to exchange energy in less than a predetermined total time including a driving time and a transfer time, include one or more compatible transfer mechanisms, be associated with a rating indication greater than a predetermined threshold, and/or the like. The rating indication may include an indication of average transfer efficiency, an indication of average transfer rate, an indication of a total amount of energy transferred, an indication of a net amount of energy transferred, and/or the like. The possible exchange partners may be identified according to availability information received from the possible exchange partners. The availability information may include an urgency of a task being performed (e.g., a task that interferes with the transfer of electrical energy), a willingness to exchange electrical energy, a price indication, an indication of a charge state, a required deviation, an indication of a presence of a driver, and/or the like.

The negotiation and/or source identification subsystem may identify the second vehicle by initially soliciting offers to exchange electrical energy and/or sending one or more requests for electrical energy to one or more other vehicles. The requests may be sent to one or more other vehicles in a common fleet or affinity group. The solicitations and/or requests may include an urgency indicator, an indication of a quantity of electrical energy needed, an indication of a distance or driving time to the first vehicle, an indication of a total time including a driving time and a transfer time, and/or the like. The negotiation and/or source identification subsystem may decide whether to send an urgency indicator by determining whether an energy level in an energy reservoir has fallen below a reserve energy threshold. The second vehicle may include a negotiation and/or source identification subsystem to receive the request from the first vehicle.

In some embodiments, the request may be sent to a central location, which may forward the request to one or more possible exchange partners according to predetermined criteria. The forwarded request may include electrical characteristics of the first vehicle, a location of the first vehicle, and/or the like. A communication subsystem at the central location may receive responses from the possible exchange partners. The communication subsystem may then transmit indications of the possible exchange partners to the first vehicle based on the responses.

The negotiation, communication, and/or source identification subsystem may receive a plurality of responses from other vehicles and/or a plurality of indications of a willingness to exchange electrical energy. The indications may be in response to the solicitations and/or requests, or the indications may be unsolicited. The responses may further include an indication of a quantity of energy available for transfer, an indication of a distance or driving time, an indication of a total time including a transfer time and a driving time, and/or the like. The quantity of energy available for transfer may be determined by determining a distance to be travelled, determining a distance to a next charging stop, and/or the like. The quantity of energy may also be determined by receiving an indication of a target charge state from a central location, which may include an initial step of reporting status data to the central location. The quantity of energy may be determined by receiving user input, which may include an anticipated destination and/or an anticipated route. The plurality of responses may be displayed to a user of the system and/or occupant of the first vehicle on a display device. The user and/or vehicle occupant may input an indication of the second vehicle from which the negotiation and/or source identification subsystem may identify the second vehicle.

The responses may include locations of possible exchange partners. The negotiation and/or source identification subsystem may identify the second vehicle by selecting a second vehicle with less than a predetermined distance or driving time and/or with which energy can be exchanged in less than a predetermined total time, wherein the total time includes a transfer time and a driving time. Also or instead, the response may include availability information. As previously discussed, availability information may include an urgency of a task being performed (e.g., a task that interferes with the transfer of electrical energy), a willingness to exchange electrical energy, a price indication, an indication of a charge state, a required deviation, an indication of a presence of a driver, and/or the like.

A bidding process may also be used to identify the second vehicle. The bidding process may also be used by the negotiation subsystem to determine a price for the quantity of electrical energy. The bidding process may include the negotiation subsystem sending one or more requests for electrical energy to one or more other vehicles. The other vehicles may be in a common fleet or affinity group. The negotiation subsystem may then receive one or more responses and/or bids from the other vehicles. A bid may include a bid price; a maximum transfer rate; a location, which may be expressed as a location relative to the first vehicle; a distance or driving time; a total time including a driving time and a transfer time; possible methods of transfer; a quantity of electrical energy available for transfer; an urgency of a task; a deviation by a vehicle sending a response from a predetermined route; and/or the like.

The negotiation and/or source identification subsystem may select a winning bid or response according to predetermined criteria. An information storage subsystem may store member information including the predetermined criteria for the first vehicle. The predetermined criteria may be a best bid price, a highest maximum transfer rate, a least distance or driving time, a least total time, a quantity of available energy above a predetermined threshold, a least urgent task, a smallest deviation, and/or the like. When the first vehicle is a seller, a best bid price may be a highest price. The negotiation subsystem may select a highest price only if it is above a predetermined threshold. When the first vehicle is a buyer, a best bid price may be a lowest price, and/or the negotiation subsystem may select a lowest bid price that is below a predetermined threshold. The bid price may be specified in units of currency and/or in points. Additional calculations may also be performed when selecting a bid, such as determining an optimized rendezvous location for each vehicle sending a bid. The nearest optimized rendezvous location may then be selected and/or used to determine distance, driving time, and/or total time.

The first vehicle may use multiple criteria in selecting a bid. For example, a seller may select a bid with a highest bid price that also has a maximum transfer rate above a predetermined threshold, a distance or driving time below a predetermined threshold, a compatible method of transfer, a quantity of available energy above a predetermined threshold, and/or the like. Similarly, a buyer may select a bid with a lowest bid price with a maximum transfer rate above a predetermined threshold, a distance or driving time below a predetermined threshold, a transfer completion time below a predetermined threshold, a compatible method of transfer, a quantity of available energy above a predetermined threshold, and/or the like.

The first vehicle may use other auctions, such as a reverse auction, a Dutch auction, or the like, to determine the price. For example, a seller may send an offer to one or more other vehicles to sell electricity at an initial asking price. If none of the other vehicles accept the offer, the seller may determine a reduced asking price by reducing the initial asking price. The seller may then send new offers at the reduced asking price to the one or more other vehicles. The seller may receive a response requesting to exchange electrical energy at the reduced asking price. If a response is not received, the seller may continue to reduce the asking price.

Other methods may also be used by the negotiation subsystem to set the price. The first vehicle may send and/or receive offers from other vehicles for electrical energy. For example, the first vehicle may receive an offer containing one or more proposed quantities of electrical energy and one or more corresponding prices. The first vehicle may then determine whether the offer meets predetermined criteria and send a response to the offer. A seller vehicle may determine a price by selecting an offered purchase price above a predetermined threshold. Similarly, a buyer vehicle may determine a price by selecting an offered sale price below a predetermined threshold. The first vehicle may also set the price by selecting a posted price. The first vehicle may send one or more offers at a predetermined posted price with an indication that the predetermined posted price is non-negotiable. Then, the first vehicle may receive a request to exchange energy at the predetermined posted price. A negotiation subsystem at the central location may receive a request for electrical energy at a requested price and may identify a second vehicle willing to exchange electrical energy at the requested price. An indication of a current market price may be accessed from a memory.

The negotiation subsystem may be configured to send or receive payment information. The payment information may include credit card information, electronic transfer information, and/or the like. The negotiation subsystem may track cumulative transfer information for a plurality of transfers and report the cumulative transfer information to a settlement agent configured to collect and disburse payments to vehicle owners based on the reported information. The settlement agent may send an indication of a price for a quantity of electrical energy to be exchanged to the negotiation subsystem. Additionally, the negotiation subsystem may send or receive payment information, such as credit card information, electronic transfer information, and/or the like to or from the settlement agent. The negotiation subsystem may receive an offer to exchange cash for a quantity of electrical energy. The negotiation subsystem may determine whether cash is an acceptable payment method and output to an occupant of the first vehicle, such as a driver or a passenger, an indication to exchange cash if cash is determined to be acceptable.

The negotiation subsystem may also determine a trustworthiness of the vehicles. If one vehicle is determined not to be trustworthy, the negotiation subsystem may refuse to exchange electrical energy with it and/or notify a user of the system and/or occupant of the other vehicle. The trustworthiness level may be determined by accessing a database of prequalified members, determining whether the vehicle belongs to an affinity group, contacting a third party, performing a credit check, determining if the vehicle is affiliated with a third party, determining if a third party guarantees payment by the vehicle, and/or the like. For example, the third party may be an insurance company that guarantees fuel for customers who pay a fee.

An authorization subsystem may determine whether either of the vehicles is affiliated with one or more particular affinity groups. For example, the particular affinity group may be a common fleet of vehicles. The affinity group may be an auto club. The affinity group may include vehicles owned by persons with familial relationships. The affinity group may be as small as two vehicles belonging to a household. The affinity groups may include people connected on a social networking site, customers of an insurance company, and/or the like. A request for electrical energy may include a digital signature, and the authorization subsystem may determine whether the signing vehicle is affiliated with an affinity group by verifying the digital signature. A central location may issue digital certificates to members of the affinity group. The authorization subsystem may also determine whether the vehicles are affiliated with an affinity group by accessing a database storing a member list and/or a list of affiliated vehicles. In some instances, affinity groups may partner, offer cross promotions, affiliate with one another, and/or the like, so the authorization subsystem may confirm one or both vehicles are associated with an affiliate affinity group. To do so, the authorization subsystem may transmit a verification request to an affiliate system and receive a verification response indicating whether the vehicles are associated with an affiliate affinity group.

A prequalification subsystem may add and remove vehicles from an affinity group. The prequalification subsystem may determine whether an applicant vehicle satisfies predetermined criteria and add the applicant vehicle if it does. The prequalification subsystem may check a vehicle registration report and/or title history to confirm the owner of the car. The prequalification subsystem may perform a credit check for one or more persons associated with the applicant vehicle and/or verify the validity of a credit card number. An initial deposit may be required, so the prequalification subsystem may transmit a request for a deposit payment to a credit card processing entity including the credit card number, and add the applicant if the request is approved.

The authorization subsystem may authorize an exchange of electrical energy between the first and second vehicles. For example, the first vehicle may send a first authorization request to exchange electrical energy with the second vehicle, and the communication subsystem may transmit a response indicating whether the authorization subsystem approved the first authorization request. The authorization subsystem may confirm an identity of the first and/or second vehicle to protect against fraud, identity theft, and/or the like. The identity may be confirmed by verifying a username and password, verifying an identification indicator, verifying a digital signature, and/or the like. The communication subsystem may be configured to receive a message signed by a digital signature generated by the second vehicle, and the message may include an identification indicator for the first vehicle and a timestamp. The authorization subsystem may verify that the identification indicator and timestamp match the current transaction. The communication subsystem may also receive a second authorization request from the second vehicle to exchange electrical energy with the first vehicle. The authorization subsystem may match the first and second authorization requests to ensure both vehicles desire to exchange electrical energy. Alternatively or in addition, the authorization subsystem may cause the communication subsystem to transmit a transaction confirmation to the second vehicle to confirm the second vehicle desires to engage in the transaction.

The authorization subsystem may determine whether the exchange meets predetermined exchange criteria. Members of an affinity group may have accounts with the affinity group, and the authorization subsystem may determine whether an indication of an amount of money and/or a number of points in an account of the first vehicle is more than a predetermined threshold and/or will be more than a predetermined threshold after the transaction. For example, points may be given to affinity group members for supplying energy to other vehicles, subtracted for receiving energy from another vehicle, awarded for participating in activities to support the affinity group, and/or the like. If credit is extended, the authorization subsystem may determine whether an indication of a number of monthly payments missed and/or paid late is less than a predetermined threshold. Alternatively or in addition, the authorization subsystem may determine whether an indication of an amount of money owed is less than a predetermined threshold. The authorization subsystem may transmit a request for payment to a credit card processing entity and receive a response indicating whether the request for payment is approved. The authorization subsystem may also or instead determine whether an indication of a member rating exceeds a predetermined threshold and/or whether an indication of a number of serious complaints is less than a predetermined threshold. For example, if a vehicle is associated with a crime, such as a robbery, assault, or the like, during a transfer, the authorization subsystem may decline any authorization requests.

The negotiation and/or source identification subsystem may determine electrical characteristics of the vehicles. The negotiation and/or source identification subsystem may receive an indication of the electrical characteristics from one or both of the vehicles, a central location, and/or an external database. The electrical characteristics may be transfer mechanisms the vehicles are equipped with, a peak power limit at which energy can be delivered or received by the vehicles, an on-time average power limit at which energy can be delivered or received, a peak efficiency transfer power (i.e., a power at which energy loss is minimized), a voltage level, a transfer time limit for any transfers, an amount of electrical energy available for transfer, a maximum amount of electrical energy that may be received, and/or the like.

The negotiation and/or source identification subsystem may then select transfer parameters. The transfer parameters may be selected by comparing electrical characteristics of each vehicle and selecting transfer parameters compatible with the electrical characteristics of each vehicle. The transfer parameters may be further selected to maximize the transfer rate and/or minimize loss of electrical energy during the transfer. Selecting transfer parameters may include selecting a temporary receptacle where the vehicle with excess energy may drop off a quantity of electrical energy and the vehicle needing energy can pick up the quantity of electrical energy. A transfer subsystem and/or monitoring subsystem may compare the transfer to the transfer parameters. The transfer and/or monitoring subsystem may also control the electrical energy transfer rate in accordance with the transfer parameters.

The monitoring subsystem may monitor a charge state of an energy reservoir of the first and/or second vehicle while the energy is being transferred and may determine if and when a desired charge state has been reached. Alternatively or in addition, the monitoring subsystem may monitor a transfer history. The monitoring subsystem for the vehicle delivering energy may determine whether the charge state has fallen below a predetermined threshold and end transfer if the charge state has fallen below the predetermined threshold. The monitoring subsystem may monitor a temperature of the transfer mechanism during transfer. The monitoring subsystem may determine that the transfer parameters should be changed based on the temperature and may update the transfer parameters. For example, if the temperature is too high, the monitoring subsystem may decrease the transfer rate. In contrast, the monitoring subsystem may decide to increase the transfer rate if the temperature is well below a predetermined threshold. Updating the transfer parameters may include determining a maximum transfer rate for the first vehicle that will keep the temperature below a predetermined threshold, comparing the maximum transfer rate for the first vehicle with a maximum transfer rate for the second vehicle, and selecting the highest common transfer rate. Once the transfer parameters have been updated, the monitoring subsystem may control the transfer rate in accordance with the updated transfer parameters.

The monitoring subsystem may monitor the transfer to determine if the target charge state has been reached and/or if a desired quantity of electrical energy has been transferred. For example, the monitoring subsystem may monitor an instantaneous power of the transfer, a total quantity of electrical energy transferred, and/or the like. The monitoring subsystem may be configured to compare monitoring data collected by the first vehicle with monitoring data collected by the second vehicle. Discrepancies in the monitoring data may indicate a problem with the transfer, such as excessive power leakage, and/or cheating by the second user. Accordingly, the monitoring subsystem may be configured to alert a user to discrepancies and/or terminate the transfer.

Transfer may be accomplished by various methods. The transfer may occur when the vehicles are stationary or when they are in motion. The vehicles may be arranged in a lead-tail arrangement, where one vehicle is in front of the other; a side-by-side arrangement; a head-to-head arrangement, where the vehicles face each other; and/or the like. A transfer mechanism may be positioned with robotic controls. The transfer subsystem may align the transfer mechanism with the second vehicle. The transfer subsystem may control driving of the second vehicle, and/or the transfer subsystem may control driving of the first vehicle based on commands from the second vehicle. The transfer subsystem may receive sensor data from an alignment sensor. The sensor data may be displayed to a user, and/or driving may be controlled based on the sensor data.

Various transfer mechanisms may be used by the first and second vehicles. The transfer mechanism may transfer the quantity of electrical energy wirelessly. For example, the electrical energy may be transferred inductively, wirelessly, through radio frequency (RF) waves, and/or the like. The electrical energy may be transferred using a transfer line. The transfer line may be a cable, such as a low-inductance cable, a optical fiber, and/or the like. The transfer subsystem may include a low-stored-energy switch to control transfer. The low-inductance cable and low-stored-energy switch may reduce the risk of electrical shock due to energy remaining in the transfer subsystem after the transfer mechanism has been disconnected. A transfer line may magnetically couple the transfer line to the second vehicle. The transfer line may be a breakaway cable, and the magnet may have a magnetic force smaller than a tensile strength of the transfer line.

The source identification subsystem may be configured to report a transfer summary to a central location, such as by transmitting a post-exchange report. For example, the monitoring subsystem may determine a final charge state for one or both vehicles, and the source identification subsystem may report the final charge state to the central location. The source identification subsystem may also or instead report the quantity of electrical energy transferred, an identification indicator for the first vehicle, an identification indicator for the second vehicle, a timestamp, and/or the like. The central location may act as a clearinghouse for an affinity group.

An information storage subsystem may store information about a plurality of vehicles, which may be members of an affinity group. The stored information may be updated by an accounting subsystem based on a first post-exchange report from one of the vehicles. The stored information may include electrical characteristics, addresses, account values, ratings, transfer statistics, and/or the like. The electrical characteristics may be compatible transfer mechanisms, peak power limit, on-time average power limit, peak efficiency transfer power, voltage level, transfer time limit, an amount of electrical energy available for transfer, and/or the like. Before transfer, a communication subsystem may transmit to one or both vehicles indications of electrical characteristics of the other vehicle and/or indications of transfer parameters compatible with the electrical characteristics of each vehicle. The addresses may be home addresses, work addresses, billing addresses, and/or the like.

The account values may be indications of an amount of money in an account, an indication of a non-monetary point value, and/or the like. The account values for each vehicle may be updated after the first post-exchange report is received. Transfer statistics for each vehicle, such as an indication of average transfer efficiency, an indication of average transfer rate, an indication of a total amount of energy transferred, an indication of a net amount of energy transferred, an indication of an amount of energy received, an indication of an amount of energy given, an indication of an amount of energy transferred within a predetermined time period, and/or the like, may also be updated. The first post-exchange report may include an indication of a transaction rating, and the accounting subsystem may update an average rating indication of the second vehicle with the transaction rating indication. The accounting subsystem may also verify that vehicle transaction data from the first post-exchange report matches vehicle transaction data received in a second post-exchange report from the other vehicle involved in the electricity transfer.

An adjudication subsystem may be configured to resolve a dispute between the first and second vehicles. The adjudication subsystem may save a complaint submitted by the first and/or second vehicle. The complaint may then be referred for human intervention to review and/or resolve the complaint. The adjudication subsystem may resolve some complaints without user intervention. For example, a complaint may include an indication that payment was not received. The adjudication subsystem may reimburse the payee by updating an indication of an amount of money in an account associated with that vehicle. The adjudication subsystem may then update a member rating, update a credit rating, add an indication of nonpayment to member information, refer the matter to a collection agency, and/or the like.

Any of the aforementioned subsystems may be located on the first vehicle. Alternatively, the aforementioned subsystems may be located at a remote location. In other embodiments, some subsystems may be located at a remote location and some may be located on the first vehicle, and/or subsystems may be split between the first vehicle and the remote location. Various types of electric vehicles are also contemplated. The first and/or second vehicle, either of which may be a buyer and/or a seller, may be a pure electric vehicle, a fuel cell vehicle, a hybrid vehicle, and/or the like. One or both vehicles may be a dedicated source vehicle. The dedicated source vehicle may include extra storage capacity to store electrical energy for distribution to exchange partners.

FIG. 1 is a plan view of a system 100 for negotiating an exchange of electrical energy between a first motor vehicle 110 and a second motor vehicle 120. A central location 130 may include a wireless transmission subsystem 132 to communicate with the vehicles 110, 120. The first and second vehicles 110, 120 may also include wireless transmission subsystems 112, 122 to communicate with the central location and/or each other. The first and second vehicles 110, 120 may directly negotiate exchange terms, the central location 130 may forward messages between the vehicles 110, 120, and/or the central location 130 may determine exchange terms.

Figure 2:
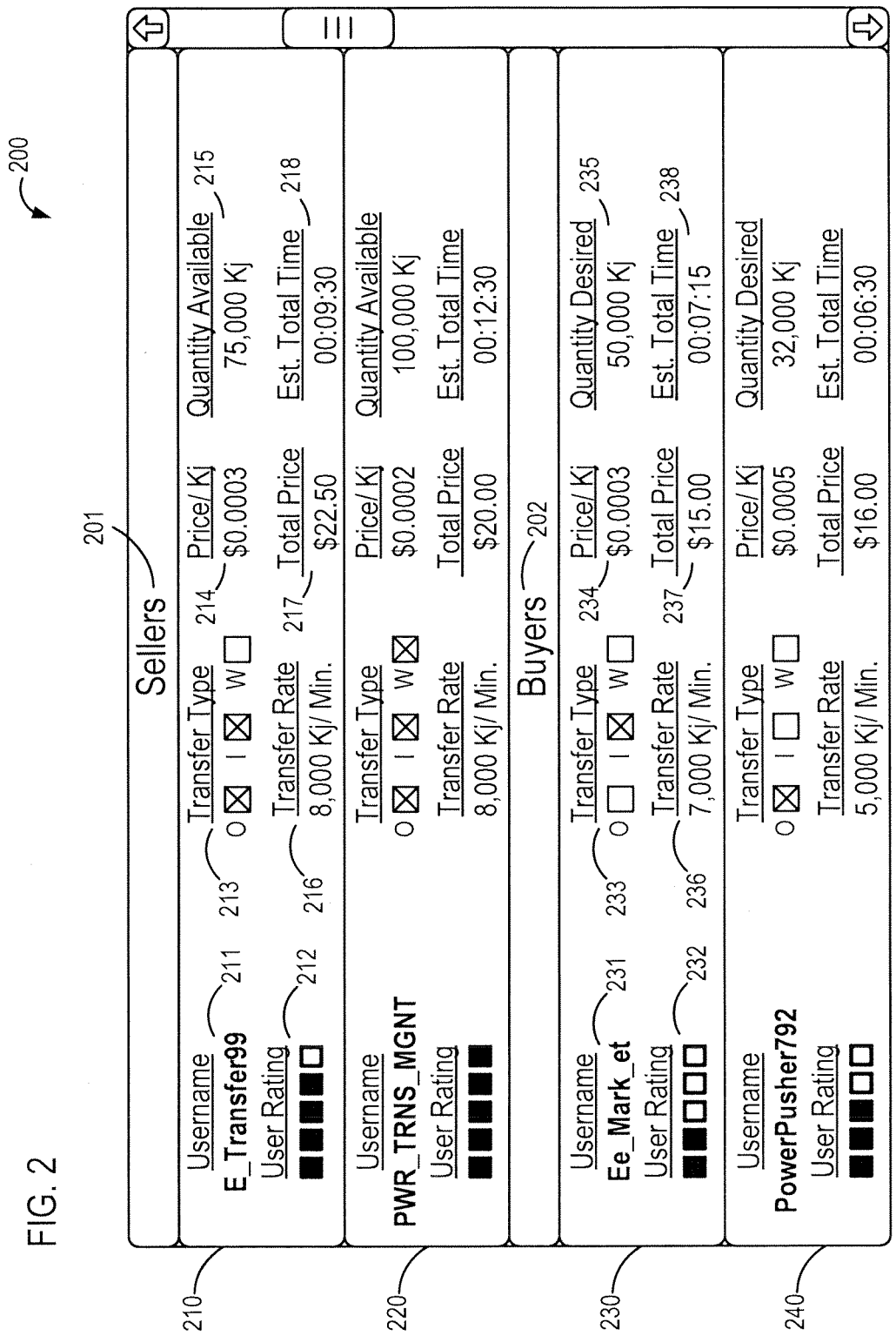
FIG. 2 is an exemplary screen display showing information about possible exchange partners.

FIG. 2 is an exemplary screen display 200 showing information about possible exchange partners 210, 220, 230, 240. The screen display 200 may be displayed to a user of the system 100, such as a driver of one of the vehicles 110, 120. In other embodiments, the information about possible exchange partners 210, 220, 230, 240 may be processed without being displayed. The information may have been received from the possible exchange partners 210, 220, 230, 240, and/or the central location 130. The screen display 200 may be subdivided into a plurality of potential sellers 201 and a plurality of potential buyers 202.

Information about each potential seller 210, 220 may be displayed, such as a username 211, a user rating 212, compatible transfer types 213, a desired sale price per unit of energy 214, a quantity of energy available for transfer 215, a transfer rate 216, a total price 217, an estimated total time 218, and/or the like. The compatible transfer types 213 may be abbreviated. In the illustrated embodiment, an optical transfer mechanism is abbreviated as "O", an inductive transfer mechanism is abbreviated as "I", and a wired transfer mechanism is abbreviated as "W". Information about each potential buyer 230, 240 may also be displayed, such as a username 231, a user rating 232, compatible transfer types 233, a desired purchase price per unit of energy 234, a quantity of energy desired 235, a transfer rate 236, a total price 237, an estimated total time 238, and/or the like.

Figure 3:
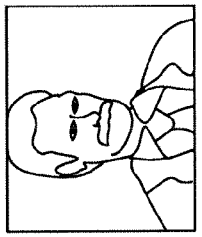
FIG. 3 is an exemplary screen display of additional information about a selected potential seller.

FIG. 3 is an exemplary screen display 300 of additional information about a selected potential seller 220. A user may select one of the possible exchange partners 210, 220, 230, 240 to find out additional information. The additional information may include an identification number 321, a license plate number 322, a price at which the potential seller is willing to sell electrical energy 323, a price at which the potential seller is willing to buy electrical energy 324, a total quantity of excess energy 325, compatible transfer types 326, a transfer rate 327, an average transfer efficiency for previous transfers 328, a total amount of energy transferred 330, and/or the like. The total amount of energy transferred 330 may be broken down into an amount supplied 331 and an amount received 332 and further broken down into several time periods, such as lifetime transfers 333, transfers in the past six months 334, and transfers in the past month 335. The breakdown may allow members of an affinity group to see if a particular member is contributing energy to the members or simply leeching off the group. Other group members may choose not to transfer energy to someone leeching off the group, and/or a central location may not authorize a transaction with a vehicle that has received significantly more energy than it has supplied.

Figure 4:
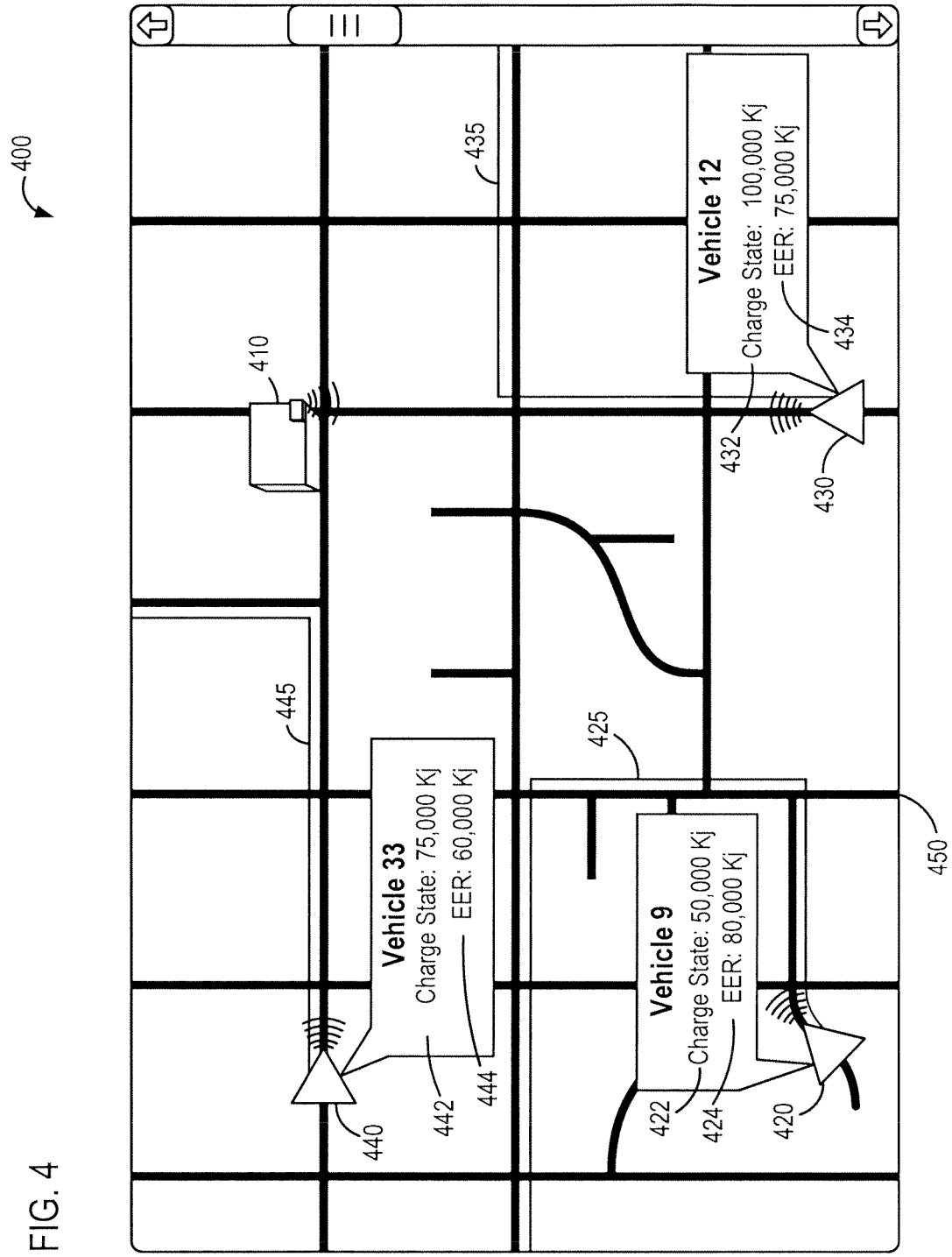
FIG. 4 is an exemplary screen display at a central location of vehicles in a common fleet.

FIG. 4 is an exemplary screen display 400 at a central location 410 of vehicles 420, 430, 440 in a common fleet. The screen display 400 may include a street map 450. Indications of the vehicles 420, 430, 440 may show the locations of the vehicles 420, 430, 440 on the street map 450. Further, statistics about the vehicles 420, 430, 440 may also be displayed. The statistics may include a charge state 422, 432, 442, an estimated energy required (EER) 424, 434, 444, and/or the like. The EER 424, 434, 444 may be the energy that is estimated as being required by a vehicle 420, 430, 440 to complete its route. An anticipated route 425, 435, 445 for each vehicle 420, 430, 440 may also be displayed.

Figure 5:
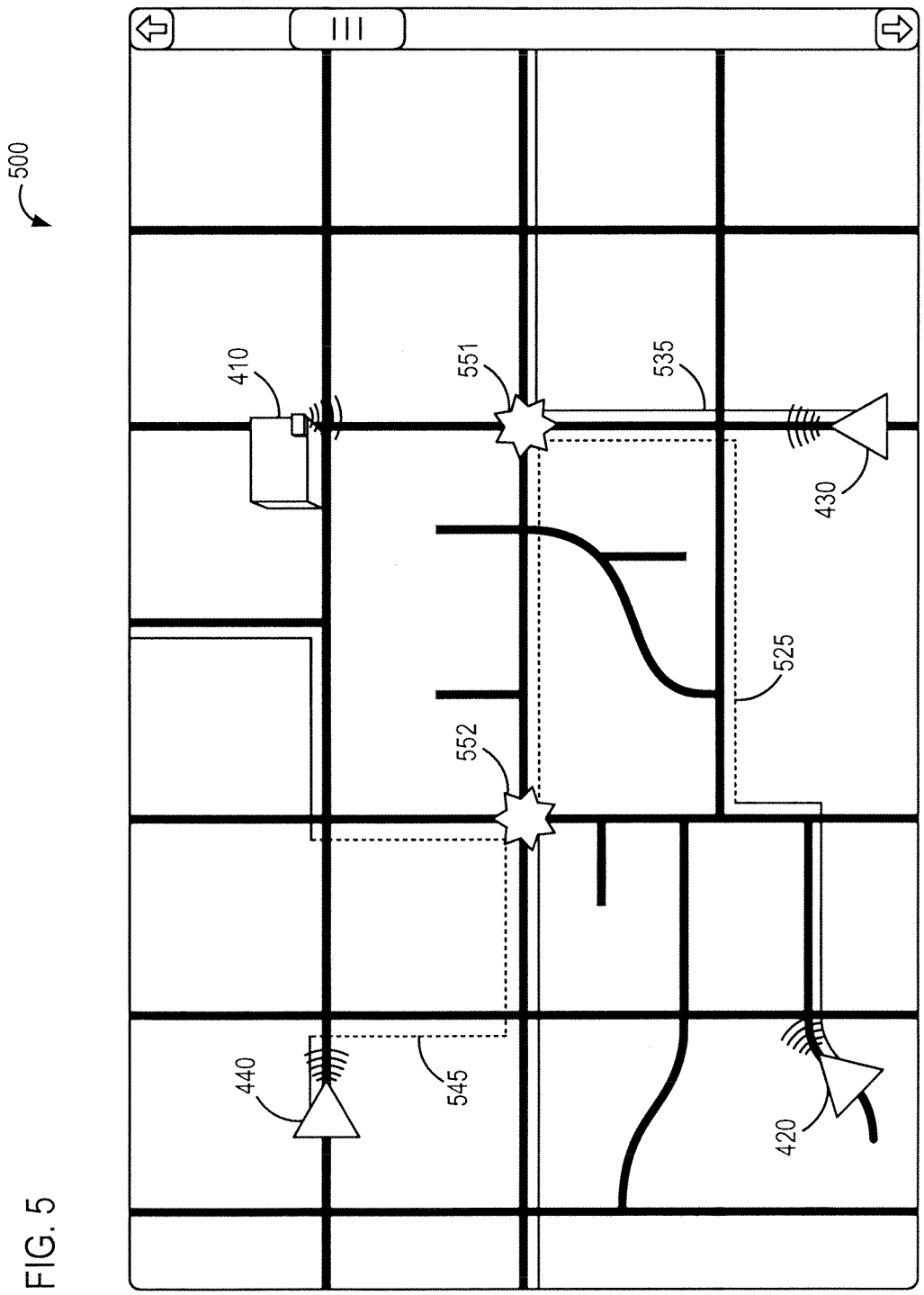
FIG. 5 is an exemplary screen display at a central location of vehicles with updated routes.

FIG. 5 is an exemplary screen display 500 at a central location 410 of vehicles 420, 430, 440 with updated routes 525, 535, 545. The EER 424 of a vehicle 420 may exceed the charge state 422 of the vehicle 420. Accordingly, the vehicle 420 may exchange electrical energy with other vehicles 430, 440 with charge states 432, 442 exceeding EER 434, 444. The original routes 425, 435, 445 of the vehicles 420, 430, 440 may be updated, so the vehicles 420, 430, 440 can meet to exchange electrical energy. The central location 410 may also determine rendezvous locations 551, 552 along the updated routes 525, 535, 545 at which the electrical energy should be exchanged.

Figure 6:
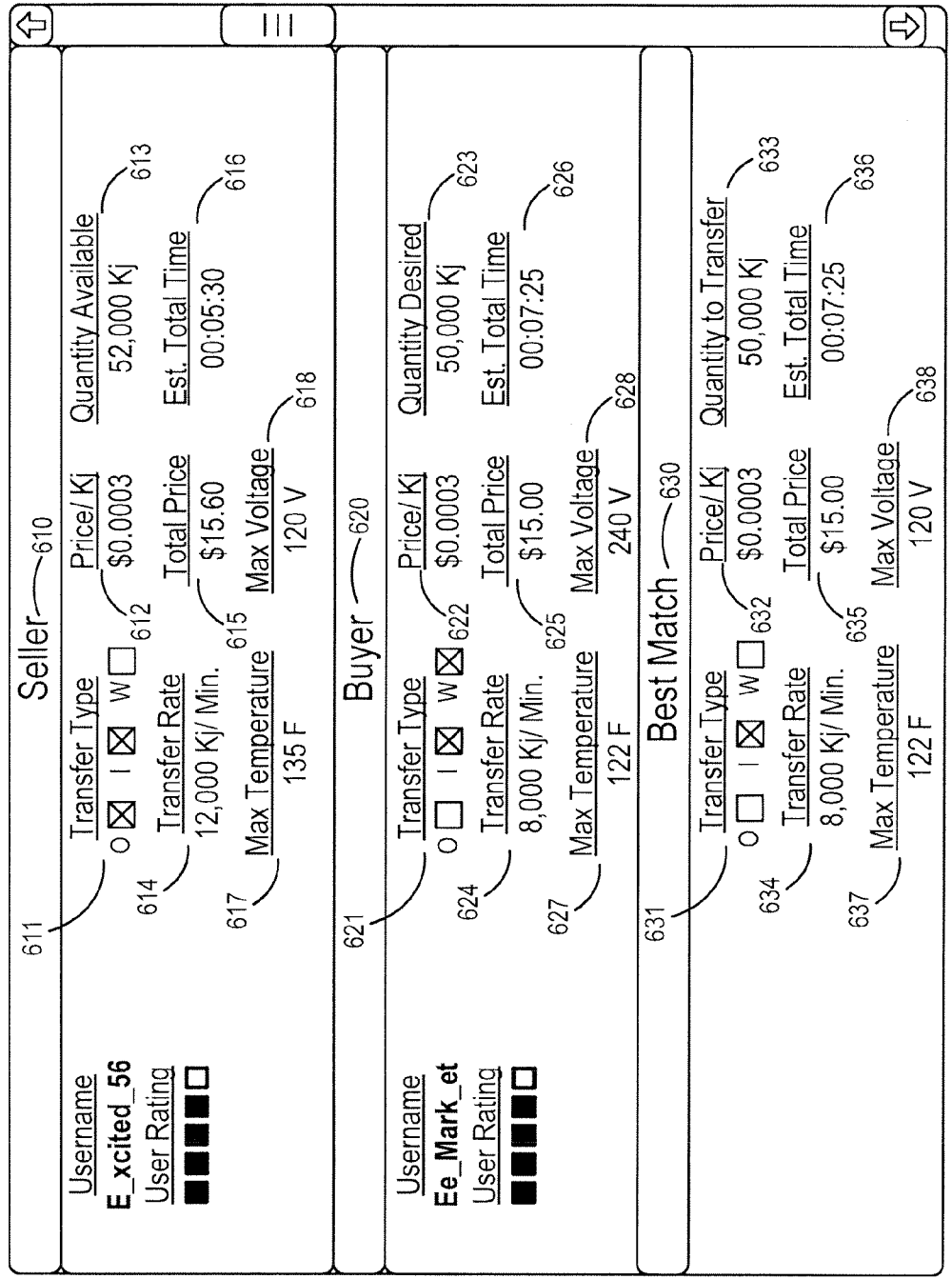
FIG. 6 is an exemplary screen display shown during selection of transfer parameters by a seller and a buyer.

FIG. 6 is an exemplary screen display 600 shown during selection of transfer parameters by a seller 610 and a buyer 620. A set of best matching transfer parameters 630 may be selected from electrical characteristics of the seller 610 and the buyer 620. The electrical characteristics may be a transfer type 611, 621; a price per unit of energy 612, 622; a quantity available 613; a quantity desired 623; a transfer rate 614, 624; a total price 615, 625; an estimated total time 616, 626; a maximum temperature 617, 627; a maximum voltage 618, 628; and/or the like. The best matching transfer parameters 630 may then be selected as a transfer type 631 compatible with both vehicles; an agreed upon price per unit of energy 632; a quantity to be transferred 633, which may be the lesser of the quantity available 613 and the quantity desired 623; a maximum transfer rate 634 compatible with both vehicles; a total price 635 computed from the quantity 633 and unit price 632; the greatest total time 636; a maximum temperature 637, which may be a lesser of each vehicle's maximum temperature 617, 627; a maximum voltage 638, which may be the lesser of each vehicle's maximum voltage 618, 628; and/or the like. The best matching transfer parameters 630 may be selected without display to the user, and/or a central location may select the best matching transfer parameters.

Figure 7:
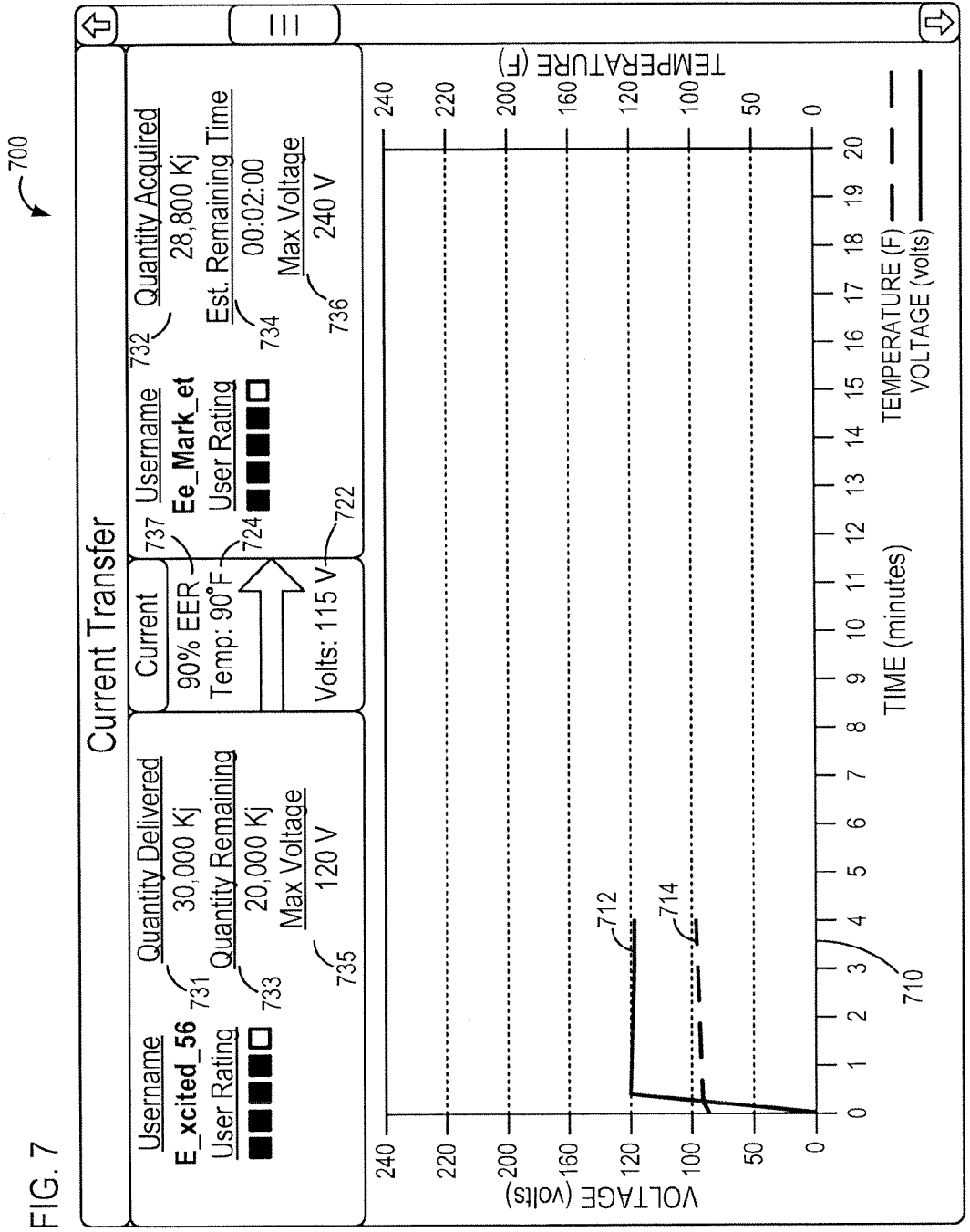
FIG. 7 is an exemplary screen display of transfer data from a transfer being monitored.

FIG. 7 is an exemplary screen display 700 of transfer data from a transfer being monitored. A graph 710 of a voltage 712 and a temperature 714 monitored by the monitoring subsystem may be displayed to a user. Numerical values for the voltage 722 and the temperature 724 may also be displayed. In some embodiments, both a quantity of energy delivered 731 and a quantity of energy acquired 732 may be displayed and may differ due to energy lost during transfer. Additionally, the estimated quantity remaining to be delivered 733, an estimated time remaining 734, a maximum voltage for each vehicle 735, 736, a percentage of the estimated energy required 737, and/or the like may be displayed to the user.

Figure 8:
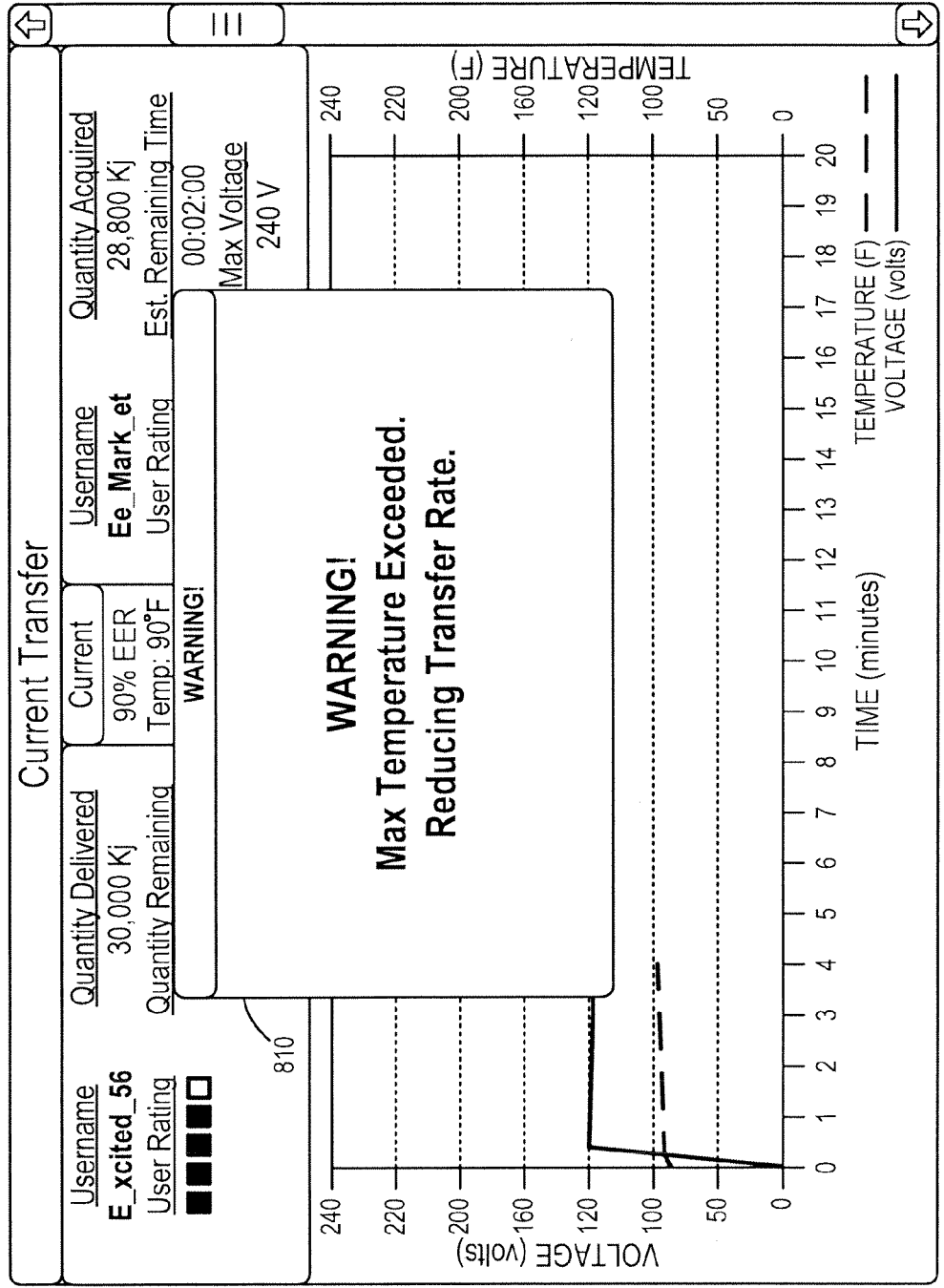
FIG. 8 is an exemplary screen display of a warning message that may be shown to a user if a maximum temperature has been exceeded.
Figure 9:
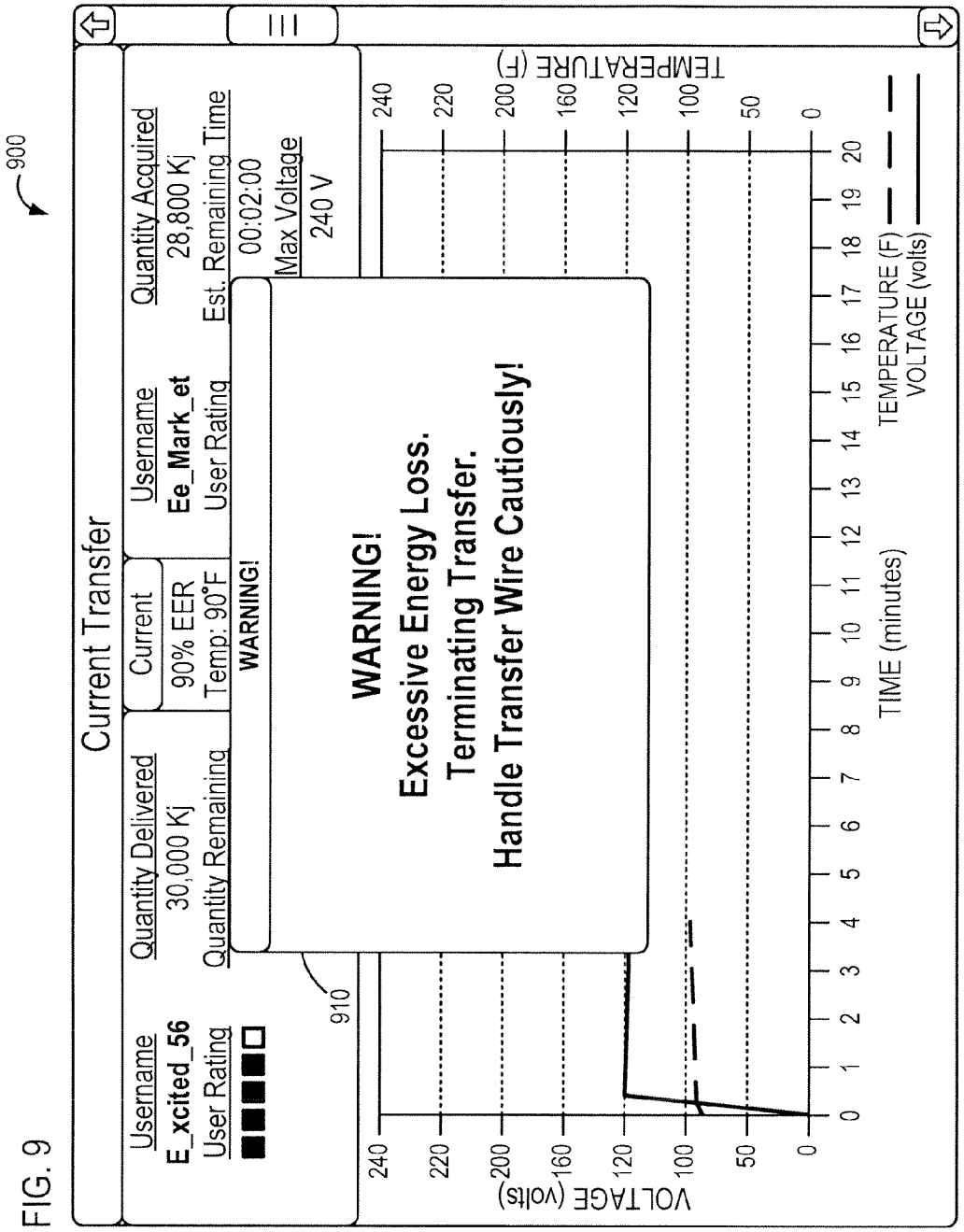
FIG. 9 is an exemplary screen display of a warning message that may be displayed if too much energy is lost.

FIG. 8 is an exemplary screen display 800 of a warning message 810 that may be shown to a user if a maximum temperature has been exceeded. The warning message 810 may inform the user that the maximum temperature has been exceeded. The warning message 810 may also describe a response that is being taken, such as reducing the transfer rate. Similarly, FIG. 9 is an exemplary screen display 900 of a warning message 910 that may be displayed if too much energy is lost. The excessive energy loss may be determined by comparing the quantity delivered 731 to the quantity acquired 732. The excessive energy loss may indicate that the other vehicle is cheating, that a dangerous condition exists, and/or the like. The warning message 910 may inform a user of the potentially dangerous condition and may terminate the transfer to mitigate the danger. In some embodiments, a monitoring subsystem in one vehicle will need to send a message to a monitoring subsystem in the other vehicle for the transfer rate to be reduced or the transfer to be terminated.

Figure 10:
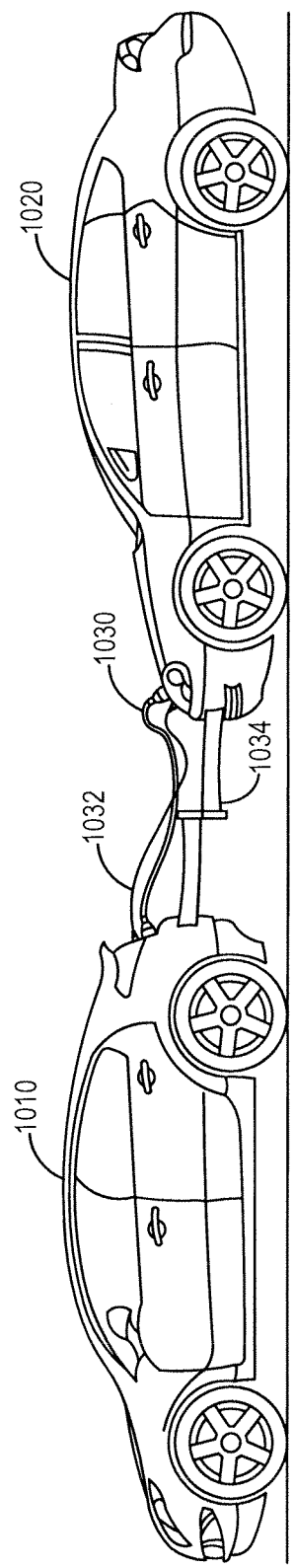
FIG. 10 is a side view of a lead vehicle and a tail vehicle exchanging electrical energy.

FIG. 10 is a side view of a lead vehicle 1010 and a tail vehicle 1020 exchanging electrical energy. An electrical cable 1030 may convey electrical energy between the vehicles 1010, 1020. An information wire 1032 may also be coupled to each vehicle 1010, 1020 and may convey information about the transfer, such as monitoring data, charge state, and/or the like. In some embodiments, the transfer information may be sent wirelessly between the vehicles. The exchange of electrical energy may occur while the vehicles are stationary and/or while the vehicles are in motion. A brace 1034 may couple the vehicles 1010, 1020 together and allow the lead vehicle 1010 to control driving of the tail vehicle 1020.

Figure 11:
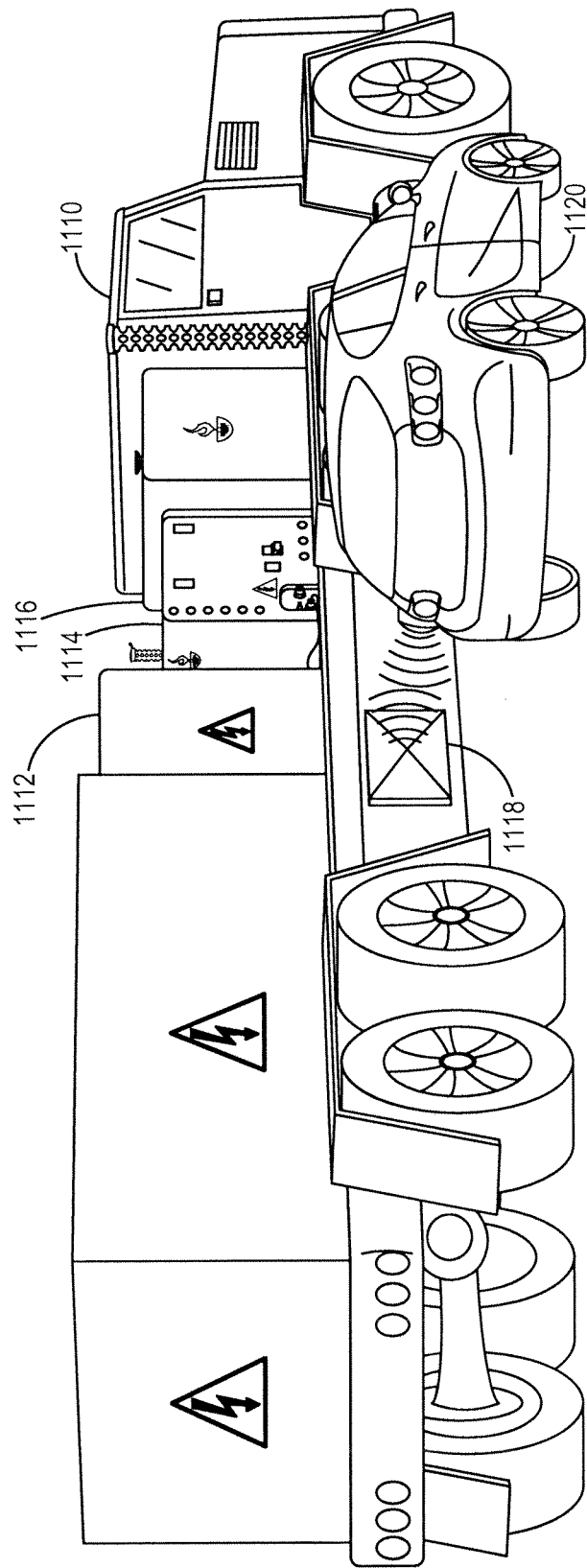
FIG. 11 is a back view of a dedicated source vehicle exchanging electrical energy with a second vehicle.

FIG. 11 is a back view of a dedicated source vehicle 1110 exchanging electrical energy with a second vehicle 1120. The dedicated source vehicle 1110 may include an electrical energy storage unit 1112 to store large amounts of excess energy. The dedicated source vehicle 1110 may also be able to produce electrical energy, such as with a generator 1114 and a fuel source 1116. The dedicated source vehicle 1110 may include a plurality of different types of transfer mechanisms, such as the RF wave transmission mechanism 1118 illustrated, so the dedicated source vehicle 1110 can exchange electrical energy with vehicles equipped with any type of transfer mechanism.

It will be understood by those having skill in the art that many changes may be made to the details of the above-described embodiments without departing from the underlying principles of the disclosure. The scope of the present disclosure should, therefore, be determined only by the following claims.

The invention claimed is:

1. A system for transferring electrical energy between first, second, and third vehicles, the system comprising:
    a plurality of subsystems associated with the first vehicle in a first location, the subsystems configured to:
    identify a target destination,
    identify a second vehicle with a limited amount of excess electrical energy with which the first vehicle can negotiate a transfer of electrical energy, wherein the second vehicle is located at an intermediate location between the first location and the target destination and wherein the limited amount of excess electrical energy is insufficient for the first vehicle to travel to the target destination, identify a third vehicle with which the first vehicle can negotiate a transfer of
    electrical energy, wherein the third vehicle is available to travel to meet the first vehicle between the intermediate location and the target destination,
    determine a second intermediate location for the first vehicle to receive electrical energy from the third vehicle subsequent to a transfer of electrical energy between the first and second vehicles, wherein the third vehicle and the second intermediate location for receiving electrical energy from the third vehicle are determined based on the limited amount of excess electrical energy of the second vehicle and the distance between the intermediate location and the target destination, and
    determine a target charge state for the first vehicle to achieve from the transfer of electrical energy between the first and second vehicles based on the determined second intermediate location for the first vehicle to receive electrical energy from the third vehicle; and an energy transfer mechanism configured to transfer a quantity of electrical energy from the second and third vehicles to the first vehicle.

2. The system of claim 1, wherein the first, second, and third vehicles are in a common fleet or affinity group.

3. The system of claim 1, wherein at least one of the subsystems is configured to determine a target charge state by determining a distance to be travelled by the first vehicle.

4. The system of claim 1, wherein at least one of the subsystems is configured to determine a target charge state by determining a distance to a next charging station along a projected route where additional electrical energy is available for transfer to the first vehicle.

5. The system of claim 4, wherein at least one of the subsystems is further configured to receive from a central location an indication of the distance to a next charging stop.

6. The system of claim 1, wherein at least one of the subsystems is configured to determine a target charge state based on an indication of the target charge state received from a central location.

7. The system of claim 6, wherein at least one of the subsystems is configured to determine a target charge state by performing an initial step of reporting status data to the central location.

8. The system of claim 7, wherein at least one of the subsystems is configured to report status data selected from the group consisting of location data, route, traffic conditions, stops completed, stops remaining, energy remaining, and average energy usage.

9. The system of claim 1, wherein at least one of the subsystems is configured to determine a target charge state by receiving user input.

10. The system of claim 9, wherein at least one of the subsystems is configured to determine a target charge state by receiving user input including an anticipated destination.

11. The system of claim 9, wherein at least one of the subsystems is configured to determine a target charge state by receiving user input including an anticipated route.

12. The system of claim 1, wherein at least one of the subsystems is configured to determine a target charge state by accessing a travel itinerary from a remote location.

13. The system of claim 1, wherein at least one of the subsystems is further configured to determine the quantity of electrical energy to transfer.

14. The system of claim 13, wherein at least one of the subsystems is configured to determine the quantity by:
  calculating an amount of energy required to reach the target charge state; and
  calculating an amount of energy expected to be lost during transfer.

15. The system of claim 13, wherein at least one of the subsystems is further configured to calculate a transfer rate and a transfer time required to reach the target charge state.

16. The system of claim 1, wherein at least one of the subsystems is configured to identify the second vehicle by receiving an indication of the second vehicle from a central location.

17. The system of claim 1, further comprising a monitoring subsystem configured to determine a final charge state for at least one of the first vehicle and the second vehicle.

18. The system of claim 17, wherein at least one of the subsystems is further configured to report the final charge state to a central location.

19. The system of claim 1, wherein at least one of the subsystems is configured to report at least one of the quantity of electrical energy transferred, an identification indicator for the first vehicle, an identification indicator for the second vehicle, and a time stamp to a central location.

* * * * *